United States Patent
Skillermark et al.

(10) Patent No.: US 8,699,422 B2
(45) Date of Patent: Apr. 15, 2014

(54) METHOD AND APPARATUS FOR ALLOCATION OF RADIO RESOURCES

(75) Inventors: Per Skillermark, Stockholm (SE); Anders Furuskar, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1446 days.

(21) Appl. No.: 12/088,209

(22) PCT Filed: Sep. 25, 2006

(86) PCT No.: PCT/EP2006/066713
§ 371 (c)(1),
(2), (4) Date: Mar. 26, 2008

(87) PCT Pub. No.: WO2007/039513
PCT Pub. Date: Apr. 12, 2007

(65) Prior Publication Data
US 2009/0059852 A1    Mar. 5, 2009

(30) Foreign Application Priority Data
Sep. 29, 2005  (EP) ..................................... 05109010

(51) Int. Cl.
*H04W 4/00* (2009.01)
*H04J 3/00* (2006.01)

(52) U.S. Cl.
USPC ............ 370/329; 370/238; 370/321; 370/336

(58) Field of Classification Search
USPC ....................................................... 370/329
See application file for complete search history.

(56) References Cited

U.S. PATENT DOCUMENTS

| | | | | |
|---|---|---|---|---|
| 5,574,934 | A * | 11/1996 | Mirashrafi et al. | 709/207 |
| 5,956,642 | A | 9/1999 | Larsson et al. | |
| 6,940,624 | B1 * | 9/2005 | Sardesai | 398/79 |
| 7,027,400 | B2 * | 4/2006 | O'Neill | 370/235 |
| 7,027,409 | B2 * | 4/2006 | Cain | 370/252 |
| 7,103,806 | B1 * | 9/2006 | Horvitz | 714/43 |
| 7,207,041 | B2 * | 4/2007 | Elson et al. | 718/104 |
| 7,233,771 | B2 * | 6/2007 | Proctor et al. | 455/11.1 |
| 7,251,218 | B2 * | 7/2007 | Jorgensen | 370/235 |
| 7,286,828 | B2 * | 10/2007 | Ades | 370/254 |
| 7,333,458 | B2 * | 2/2008 | Cain | 370/337 |
| 7,349,423 | B2 * | 3/2008 | Pantelias | 370/458 |
| 7,397,767 | B2 * | 7/2008 | Taffin et al. | 370/252 |

(Continued)

FOREIGN PATENT DOCUMENTS

EP   0 825 794   2/1998
EP   1 146 760   10/2001

OTHER PUBLICATIONS

Translation of Russian official action Aug. 10, 2009, in corresponding Russian Application No. 2008116836.

(Continued)

*Primary Examiner* — Melvin H Pollack
(74) *Attorney, Agent, or Firm* — Nixon & Vanderhye P.C.

(57) ABSTRACT

An estimate of a cost of allocating radio resources available for allocation to a at least one radio link within a cell is generated in dependency of which radio resources have been used within the cell at previous times. This cost estimate can be compared to a quality gain of allocating the radio resources to the radio link, and an allocation decision can be made in dependency of the comparison result.

20 Claims, 5 Drawing Sheets

(56) References Cited

U.S. PATENT DOCUMENTS

| | | | |
|---|---|---|---|
| 7,409,450 B2 * | 8/2008 | Jorgensen | 709/226 |
| 7,436,876 B2 * | 10/2008 | Fisher et al. | 375/130 |
| 7,474,650 B2 * | 1/2009 | O'Neill | 370/349 |
| 7,656,813 B2 * | 2/2010 | Kloper | 370/252 |
| 7,660,649 B1 * | 2/2010 | Hope et al. | 700/295 |
| 7,676,223 B2 * | 3/2010 | Das et al. | 455/422.1 |
| 7,933,252 B2 * | 4/2011 | Kubler et al. | 370/338 |
| 2002/0065864 A1 * | 5/2002 | Hartsell et al. | 709/100 |
| 2002/0152305 A1 * | 10/2002 | Jackson et al. | 709/224 |
| 2003/0012137 A1 * | 1/2003 | Abdelilah et al. | 370/229 |
| 2003/0037113 A1 * | 2/2003 | Petrovykh | 709/205 |
| 2003/0046396 A1 * | 3/2003 | Richter et al. | 709/226 |
| 2003/0112784 A1 | 6/2003 | Lohtia et al. | |
| 2003/0231647 A1 * | 12/2003 | Petrovykh | 370/429 |
| 2003/0236745 A1 * | 12/2003 | Hartsell et al. | 705/40 |
| 2004/0053597 A1 | 3/2004 | Agin | |
| 2004/0109471 A1 * | 6/2004 | Minde et al. | 370/465 |
| 2004/0196910 A1 * | 10/2004 | Bobier et al. | 375/240.19 |
| 2004/0198386 A1 * | 10/2004 | Dupray | 455/456.1 |
| 2006/0230450 A1 * | 10/2006 | Bu et al. | 726/22 |
| 2007/0002859 A1 * | 1/2007 | Corson et al. | 370/390 |
| 2008/0273606 A1 * | 11/2008 | Orfanos et al. | 375/260 |
| 2011/0102258 A1 * | 5/2011 | Underbrink et al. | 342/357.47 |

OTHER PUBLICATIONS

Communication mailed Oct. 8, 2008 in corresponding EP Application 06 806 808.9-1525.
3rd Generation Partnership Project, (3GPP TS 25.433), "Technical Specification Group Radio Access Network; UTRAN lub interface Node B Application Part (NBAP) signaling (Release 6)", vol. 6.6.0, pp. 1, 2, 31-34, 52-55 and 256-268, (Jun. 2005).
International Search Report for International Application No. PCT/EP2006/066713, mailed Jan. 12, 2007.
Written Opinion of the International Searching Authority for PCT/EP2006/066713, mailed Jan. 12, 2007.
International Preliminary Report on Patentability for PCT/EP2006/066713, completed Jan. 29, 2008.

\* cited by examiner

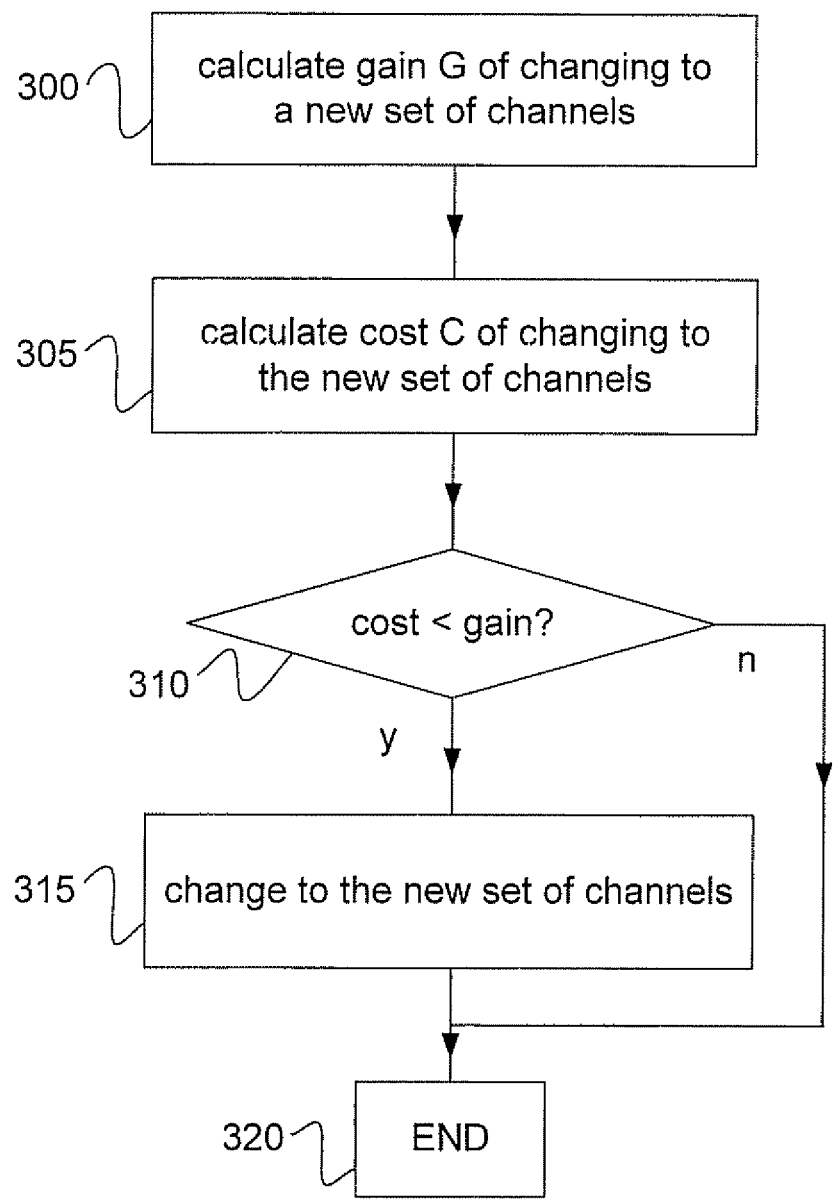

METHOD AND APPARATUS FOR ALLOCATION OF RADIO RESOURCES

This application is the U.S. national phase of International Application No. PCT/EP2006/066713, filed 29 Sep. 2005, which designated the U.S. and claims priority to EP 05109010.8, filed 29 Sep. 2005, the entire contents of each of which are hereby incorporated by reference.

TECHNICAL FIELD

The technology relates to the field of mobile radio communications, and in particular to the field of resource allocation.

BACKGROUND

In mobile radio communications, the quality of a radio link over which data is transferred varies over time, due to changes in the distance between the mobile station and the radio base station, changes in the interference from other radio links, changes in the reflection pattern of the radio waves caused for example by passing cars, etc. Such changes in the radio conditions will influence different channels differently. Hence, in order to ensure a good quality connection between the mobile terminal and the radio base station, the quality of the radio link should preferably be monitored, and actions should be taken if the monitoring shows that the quality of the radio link is unacceptable or can be improved. Such actions could include re-scheduling the radio link to another channel, and/or adapting the transmission format, such as the modulation scheme and channel coding parameters, to the new conditions.

When allocating radio resources to radio links within a cell, it is important to take into account interference of radio links in other cells which are transmitting at the same frequency.

In U.S. Pat. No. 5,956,642, a method and system of adaptive channel allocation in a multi-carrier, multi-slot system is provided, by which co-channel interference between cells is reduced. In the disclosed method and system, an initial subset of M channels is chosen from a larger set of N channels that are available for communication on each separate link of the multi-carrier, multi-slot system. The subset of M channels is used to carry communications on the link. As communications take place on the link, the channel-over-interference level (C/I) of the channels within the subset of M channels, and the interference (I) level of all N available channels is periodically measured. During communications on the link, the system determines from the C/I and I measurements if at least one more preferred unused channel which would give better signal reception on the link than at least one channel of the set of M is available in the cell within which the link exists. If it is determined that at least one more preferred unused channel exists, the system reconfigures the subset of M channels to include the at least one unused channel.

SUMMARY

A problem is how to improve the performance of a mobile radio communications system.

This problem is addressed by a method of allocating radio resources to at least one radio link in a cell within a mobile radio communications system. The method comprises generating an estimate of a cost of allocating radio resources available for allocation to the at least one radio link, wherein the cost estimate is generated in dependency of which radio resources have been used within the cell at previous times; and allocating radio resources to the at least one radio link in dependency of the cost estimate.

The problem is further addressed by an apparatus for allocating radio resources to at least one radio link in a cell within a mobile radio communications system. The apparatus comprises cost estimating means for generating an estimate of the cost of allocating radio resources available for allocation to the at least one radio link, wherein the cost estimating means are arranged to generate the cost estimate in dependency of which radio resources have been used within the cell at previous times.

The method and apparatus improve the performance of a mobile radio communications system since variations in the interference experienced by radio links in the system can be reduced, and the experienced interference becomes more predictable. The influence of a change in the resource allocated to radio links in a cell on the experienced interference in neighbouring cells can be taken into account when making allocation decisions.

In one non-limiting, example embodiment, the method further comprises: generating an estimate of the radio quality of radio resources available for allocation; comparing the radio quality estimate with the cost estimate resulting in a comparison result; and the step of allocating comprises allocating radio resources to the radio link in accordance with the comparison result. In this embodiment, the apparatus comprises: quality estimating means arranged to estimate a quality measure of radio resources available for allocation and to generate a radio quality estimate; comparing means arranged to compare the radio quality estimate with the cost estimate and to generate a comparison result; and allocating means arranged to allocate radio resources to the at least one radio link in accordance with the comparison result. Hereby is achieved that the gain of allocating particular resources to radio links within the cell can be weighed against the cost in terms of increased variations in interference in neighbouring cells, and the allocation decision be made accordingly. For example, if several resource units yielding the same quality gain are available, the resource units causing the least interference variations in the neighbouring cells can be allocated first, and the resource units causing more interference variations be allocated only if needed.

In a system wherein the radio resources are arranged in channels divided into time frames, the step of generating an estimate of the cost can comprise: checking whether an available channel was allocated to a radio link in the cell during a time frame being the most recently scheduled time frame; and increasing the cost estimate if the available channel was not allocated to a radio link in the most recently scheduled time frame. In such a system, the cost estimating means of the apparatus can be arranged to check whether an available channel was allocated to a radio link in the cell during a time frame being the most recently scheduled time frame and to increase the cost estimate if the available channel was not allocated to a radio link in the most recently time frame. Hereby is achieved that the probability of changes occurring to the set of channels used within a cell is reduced, and the experienced interference in neighbouring cells is hence less likely to fluctuate between time frames.

In another aspect of the invention, when implemented in a system in which the radio resources are arranged in channels divided into time frames, the step of generating an estimate of the cost comprises checking the spectral distance between a channel allocated in the cell during the time frame being the most recently scheduled time frame and a channel available for allocation, wherein the cost estimate increases with said spectral distance. In this aspect, the cost estimating means is arranged to check a spectral distance between a channel allocated in the cell during the time frame being the most recently scheduled time frame and a channel available for allocation, and to generate a cost estimate in a manner so that the cost estimate increases with increasing spectral distance. Hereby is achieved that channels which have not been used in the previous time frame, but which are spectrally near a channel which have been used in the previous time frame, can be favoured over channels which are spectrally more distant to any previously used channel.

The technology described in this application can be used to identify a new set of channels to be allocated to radio links within a cell. A number of comparison results can be generated, and the channels of the new set of channels can be selected in accordance with the comparison results.

The method may advantageously include a step of estimating the number of radio links within the cell, resulting in a load measure; and the execution of the step of generating an estimate of the cost can then be conditional on the load measure being below a load threshold. Since changes in the set of channels used in a cell is more likely to cause variations in interference in neighbouring cells if the load is low, the cost estimate plays a greater part in low load situations. Furthermore, when the load in a cell is high, the number of available channels within the cell is lower, and the degree of freedom when choosing the channels to be allocated is lower. Hence, time and resources for performing computations can be more efficiently utilised if the cost estimate is only generated when the load exceeds a certain load threshold.

A computer program product is provided for performing the method, and a radio base station, as well as a mobile radio communication system, comprising the apparatus.

BRIEF DESCRIPTION OF THE DRAWINGS

FIG. 3 is a flowchart illustrating a method of estimating whether the allocation of a new set of channels within a cell would improve the performance of the mobile radio communications system compared to a set of channels previously used within the cell.

DETAILED DESCRIPTION

Figure 1:
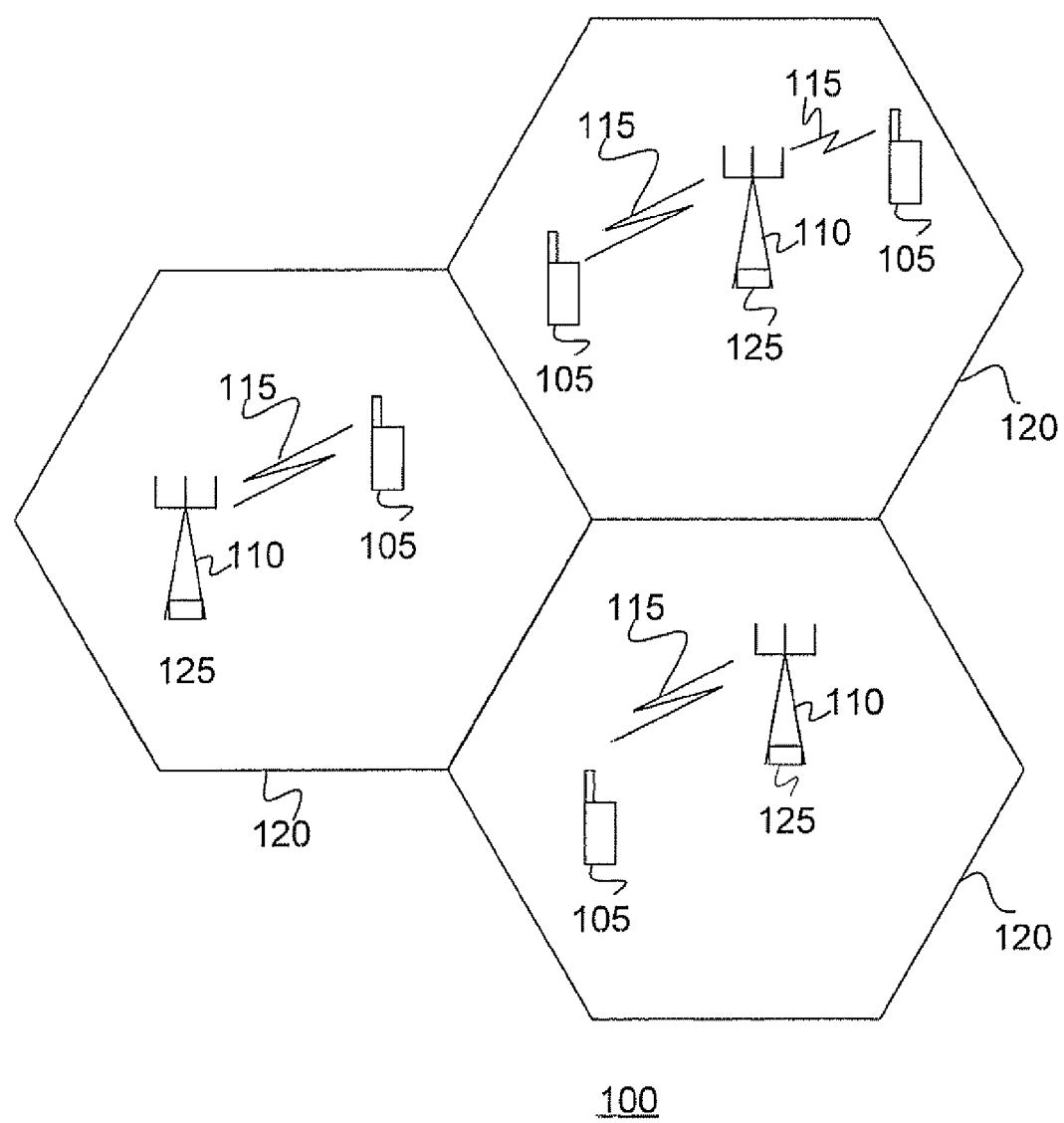
FIG. 1 is a schematic illustration of a mobile radio communications system.

FIG. 1 schematically illustrates a mobile radio communications system 100, hereinafter referred to as system 100, in which a mobile station 105 can communicate with a radio base station 110 over a radio link 115. The radio base stations 110 are connected to a core network, which is not shown in the figure. A geographical area served by a radio base station 110 is often referred to as a cell 120.

A radio link 115 can typically be used for voice calls, as well as for data transfer sessions. In the following, calls, as well as data transfer sessions, will be referred to as sessions. Different sessions could involve communication between the same mobile station 105 and a radio base station 110 over the same radio link 115, or between different mobile stations 105 and the radio base station 110 over different radio links 115.

Figure 2A:
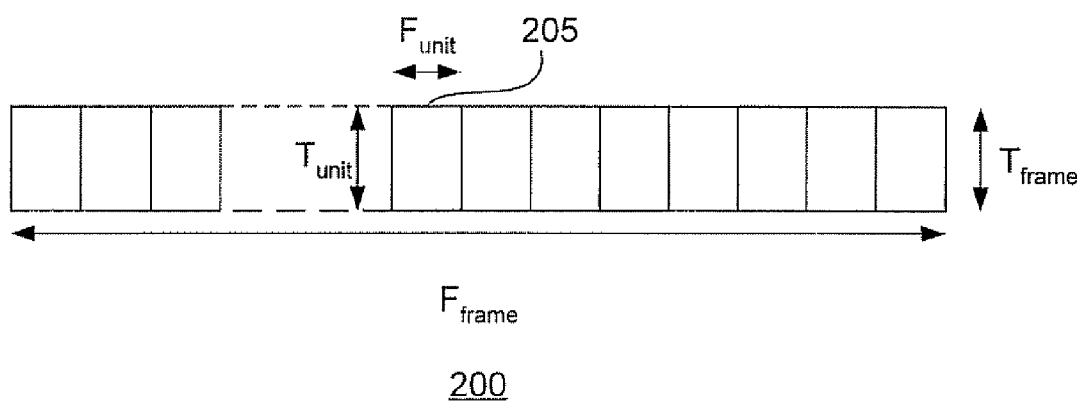
FIG. 2a schematically illustrates a frame comprising a number of resource units.
Figure 2B:
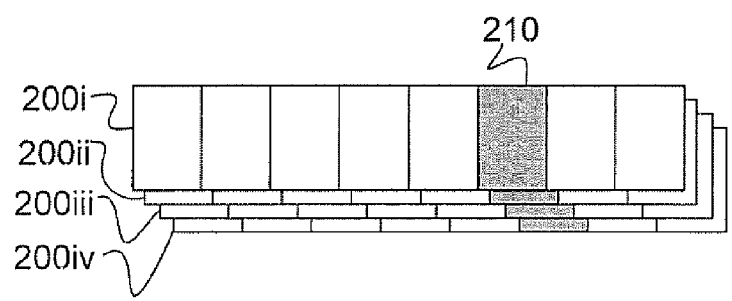
FIG. 2b illustrates a channel comprising the resource units occupying the same frequency band in different frames.

In the following, the radio resources available for communication between a radio base station 110 and mobile terminals 105 will be considered to consist of a plurality of resource units. A resource unit is the smallest unit that can be allocated to a radio link 115 and is often the smallest unit for which the transmission format is constant. In FIG. 2a, the concept of resource units is illustrated for a system 100 operating according to Time and Frequency Division Multiple Access (TD/FDMA). A time frame 200 of a radio link 115 is illustrated to have a time duration $T_{frame}$ and a frequency span $F_{frame}$. The time frame 200 of FIG. 2a is illustrated to consist of a plurality of resource units 205, each having a time duration $T_{unit}=T_{frame}$ and a bandwidth $F_{unit}=F_{frame}/N$, where N is the number of resource units 205 of time frame 200. Resource units 205 which use the same frequency band but occur in different time frames 200 will in the following be referred to as a channel 210. The channel concept is schematically illustrated in FIG. 2b, in which four resource units 205 in four different time frames 200i-200iv, transmitting at the same frequency and hence belonging to the same channel 210, are highlighted. The examples provided by FIG. 2 is an example of how a time frame 200 in a system 100 based on frequency division multiple access could be divided into radio resource units 205. In a system 100 based on other ways of providing multiple access, a radio resource unit 205 could be defined by other quantities. In a system 100 based on code division multiple access, for example, a radio resource unit 205 could be defined by the quantities time and spreading code. In the following, for purposes of illustration only, the technology will be described in terms of a system 100 operating according to time and frequency division multiple access.

The term channel 210 will in the following be used to refer to one or more radio resource units 205 using a particular frequency band. In some systems, the resource units 205 can be assigned to a radio link 115 on a per-time-frame basis. The scheduling is then repeated, and the resource units 205 scheduled to the same radio link 115 in different time frames 200 often belong to different channels 210. In other systems, such as in early releases of GSM, a radio link 115 is allocated to transmit on a certain channel 210 until other instructions are received.

The quality of a radio link 115 varies over time, and depends for example on changes in the distance between the mobile station 105 and the radio base station 110, changes in the interference from other radio links 115, changes in the reflection pattern of the radio waves caused for example by passing cars, etc. In order to ensure a good quality connection over a radio link 115, the quality of the radio link is typically monitored. Such monitoring could for example include carrier-to-interference (C/I) measurements on the channel(s) 210 used by the radio link 115, where the signal strength on the radio link 115 is compared to the interference experienced at the position of the mobile station 105 in the downlink and at the position of the base station 110 in the uplink. If the monitoring shows that the quality should be improved, the radio link 115 could for example be allocated different channel(s) 210, or the transmission format could be suitably adapted. In order to gather information to be used when making the decision of whether or not to move the radio link 115 to a different channel 210, the interference, I, experienced by mobile station 105 on the channels 210 available for allocation to mobile station 105 but presently not used by mobile station 105, is typically measured.

For illustration purposes only, the quality of a radio link 115 will in the following be assumed to be determined by way of carrier-to-interference measurements. However, other methods of determining the quality of a radio link 115 could alternatively be used, and the quality could for example be measured in terms of signal strength, signal-to-noise ratio, bit error rate, block error rate or information rate.

The interference experienced by a mobile station 105 in a cell 120 typically differs from the interference experienced by other mobile stations 105 in the same cell 120, since the experienced interference varies with location. Furthermore, the radio conditions are different for different mobile stations 105 due to different locations in relation to the base station 110. Hence, the C/I value for the same channel 210 available in a cell 120 will differ between different mobile stations 105, and the channels 210 with favourable C/I and I values will differ between different mobile stations 105. The channels 210 preferred by the same mobile station 105 will vary over time as the mobile station 105 moves within a cell 120, and as the number and location of interfering mobile stations 105 vary.

When the traffic load in a cell 120 is low or moderate, the number of channels 120 in a cell 120 that have not been allocated to a radio link 115 is considerable. Hence, there is a large degree of freedom in which channels 210 to allocate to a radio link 115. In case of a low or moderate traffic load, the channels 210 allocated to different radio links 115 according to a method wherein the allocation of resources is performed in accordance with quality measurements of the radio link 115 would typically result in an allocation of resources where different mobile stations 105 are assigned channels 210 that are spectrally distant from each other. Furthermore, in a system 100 in which the channel allocation is continuously updated for ongoing sessions, the resource units 205 allocated to the same radio link 115 at different points in time could be of significantly different frequency.

Which channels 210 are used for the transmission over radio links 115 in a cell 120 influences the interference pattern in neighbouring cells 120. Fast changes in the channels 210 used for data transmission in a cell 120 will result in fast changes in the interference pattern in neighbouring cells 120, with fast and unpredictable variations in the experienced interference in the neighbouring cells 120 as a result. Such unpredictable nature of the interference may cause measurements of C/I or I values in the neighbouring cells 120 to be inaccurate, due to variations in the interference during the averaging time of the measurements, as well as to any variations in the interference that may have occurred between the time of the measurement and the time of using the measurements in resource allocation. Hence, resource allocation decisions may be taken based on C/I and I estimates that are no longer valid. Furthermore, any decision taken on adapting the transmission format of resource units 205 to the quality of a radio link 115 will also be based on incorrect grounds. This may cause a less efficient utilisation of the radio resources in terms of packet errors, packet retransmissions and increased packet delays.

A change in set of channels 210 that are used for transmission within a cell 120 is associated with a cost. Prior to changing the set of channels 210 used within the cell 120 into a new set of channels 210, this cost can be compared to the quality gain expected by the change in channels 210, in order to determine whether or not the change in channels 210 should be performed.

A flowchart schematically illustrating a method of allocating radio resources within a system 100 is shown in FIG. 3. In step 300, the total quality gain, G, of changing the set of channels 210 used within a cell 120 to a new set of channels 210 is estimated. The total cost, C, of changing the channels 210 used within the cell 120 to the new set of channels 210 is estimated in step 305. In step 310, the total quality gain, G, is then compared to the total cost, C. If in step 310 it is found that the total cost is smaller than the total quality gain, then step 315 is entered, in which the set of channels 210 used within the cell 120 is changed into the new set of channels 210. The process is then ended in step 320. If, on the other hand, it is found in step 310 that the total quality gain is smaller than the total cost, then step 320 is entered without entering step 315.

The calculation of the total quality gain, G, performed in step 310 may for example include a comparison of the number of payload bits that would be possible to transmit using the new set of channels 210 and the number of payload bits that would be possible to transmit with the previous set of channels 210. These calculations can preferably be based on C/I measurements, by which a suitable transmission format, and hence the number of payload bits, can be estimated. Alternative methods of calculating the total quality gain, G, may be used. An example of a method in which the total quality gain is given as the sum of the C/I-values for the new set of channels 210 used in the cell 120 reduced by the sum of the C/I-values in the previously used set of channels 210 is given in eq. (1).

$$G = \sum_{new} (C/I) - \sum_{previous} (C/I) \qquad (1)$$

In a cell 210 where there are R ongoing sessions transmitting data on R radio links 115, and where the sessions are of different priorities, the priorities may be taken into account when calculating the total quality gain, G, for a new set of channels 210. The expected individual quality gain, g, of each radio link 115 can be calculated separately, and a weight factor, p, reflecting the priority of the session transmitting on the radio link 115, may be applied before the total quality gain, G, is calculated:

$$G = \sum_{i}^{R} p_i g_i \qquad (2)$$

The individual quality gain, g, of a radio link 115 is obtained as the difference between the measured quality of the resource units 205 allocated to the radio link 115 in the new time frame and the measured quality of the resource units 205 allocated to the radio link 115 in the previous time frame 200.

The calculation of the cost, C, of step 305 is preferably performed in a manner so the total cost, C, is increased when the new set of channels 210 includes a channel 210 which was not allocated to any radio link 115 in the cell 120 in the previous time frame 200. An example of a function which could be used for calculating the total cost, C, is given in eq. (3), in which $A^{new}$ denotes the new set of channels 210, and $A^{previous}$ denotes the previous set of channels 210 used in the cell 120 at the previous time frame 200. For each channel 210 in the new set of channels $A^{new}$ which is not part of the previous set of channels $A^{previous}$, the total cost C is increased by f, i.e. the cost is proportional to the cardinality of the difference between the new set of channels $A^{new}$ and the previous set of channels $A^{previous}$.

$$C = f \cdot c(A^{new} \setminus A^{previous}) \qquad (3)$$

The cost function expressed by eq. (3) does only take into account whether a channel 210 of the new set of channels $A^{new}$ was used or not in the previous set of channels $A^{previous}$ used in the cell 120. The calculation of the cost, C, could advantageously further take into consideration the spectral distance between a channel 210 of the new set of channels $A^{new}$ and any channel 210 which was previously used, so that resources spectrally close to the channels 210 used within the cell 120 in the previous time frame 200 are less costly than channels 210 which are spectrally distant from the resources used in the previous time frame 200. In eq. (4), an example is given of a function used to calculate the cost, C, based on this principle:

$$C = f \sum_{i=1}^{n} \min\left\{\frac{d_i}{d_{thresh}}, 1\right\}, \quad (4)$$

The sum in expression (4) is taken over all the n channels $A_j^{new}$, j=1, ... n, of the new set of channels 210. d denotes the spectral distance to the nearest channel 210 which was used in the previous set of channels $A^{previous}$ used in the cell 120, and $d_{thresh}$ denotes a spectral distance beyond which the cost does not vary.

Both expressions (3) and (4) result in a cost being associated with the allocation of a channel 210 which was not allocated in the previous time frame 200. However, a cost function could be designed in a manner so that channels 210 which are spectrally close to channels 210 used in the previous time frame 200 would not be associated with a cost.

Furthermore, channels 210 which have been used in the near past could be less costly than channels 210 which have not been in use for a longer period of time. Hence, a channel 210 which was not in use in the previous time frame 200 but in the time frame 200 before that, can for example be less costly to use than a channel 210 which was not in use in any of the two previous time frames 200.

In equations (3) and (4) which provide examples of how to estimate the total cost, C, of allocating a new set of channels 210 within a cell 120, there is no cost associated with allocating a channel 210 which was used by a radio link 115a in the previous time frame 200 to a different radio link 115b in the new time frame 200. In another embodiment, the allocation of a channel 210 to radio link 115b, where the allocated channel 210 was allocated to another radio link 115a in the previous time frame 200, will be associated with a cost. This cost could advantageously be a smaller cost than if the channel 210 had not been used in the previous time frame 200 at all.

The factor f in the cost expressions (3) and (4) can be estimated in different ways, and could advantageously be chosen in accordance with the properties of the system 100 to which the cost calculation applies. The estimation of the factor f could advantageously be obtained by empirical studies of the influence of the changes in the set of channels 210 used in a cell 120 on the neighbouring cells. An initial estimation off could e.g. be f=0.5 dB.

The factor f could advantageously be dependent on the traffic load. The following simplified example illustrates how the factor f could vary with traffic load. Assume a system 100, in which each cell 120 is surrounded by M neighbouring cells 120, the probability of a base station 110 in a cell 120 being actively transmitting on a channel 210 is $P_{act}$, and the interference experienced in a cell 120 from a neighbouring cell 120 is independent of from which of the M neighbouring cells 120 the interference originates.

Let the contribution to the interference in a neighbouring cell 120b from a channel 210 in a cell 120a for which the cost should be calculated be denoted by $I_{own}$. Let $\langle I_{other}\rangle$ denote the average interference in the neighbouring cell 120b caused by other cells 120c. Assume that the neighbouring cell 120b experiences interference from M equally interfering cells 120, out of which cell 120a is one, and that the probability of a cell 120 being actively transmitting on the channel 210 is $P_{act}$. $I_{own}$ can then be expressed as:

$$I_{own} \approx \frac{\langle I_{other}\rangle}{(M-1)P_{act}}$$

The experienced ratio between the C/I value for the channel 210 in the neighbouring cell 120b before and after the allocation of the channel 210 in cell 120a can then be expressed as:

$$\frac{(C/I)^{after}}{(C/I)^{before}} = \frac{I^{before}}{I^{after}}$$
$$= \frac{\langle I_{other}\rangle + N}{\langle I_{other}\rangle + I_{own} + N}$$
$$\approx \frac{\langle I_{other}\rangle + N}{\langle I_{other}\rangle + \frac{\langle I_{other}\rangle}{(M-1)P_{act}} + N},$$

wherein N denotes the thermal noise. If interference dominates over thermal noise, i.e. $\langle I_{other}\rangle \gg N$, then $$\frac{(C/I)^{after}}{(C/I)^{before}} \approx \frac{1}{1+\frac{1}{(M-1)P_{act}}} \quad (6)$$

From expression (5), it can be seen that in this simplified example, the decrease in the C/I-value of the neighbouring cell 120b due to the allocation of a channel 210 in the cell 120a is larger when $P_{act}$ is low, i.e. when the load of the system 100 is low. Hence, the factor f could preferably be higher for low traffic loads than for high traffic loads.

When the interference experienced on a channel in neighbouring cells is high, the addition of a radio link using the channel will cause less variations in interference than when the interference experienced is low. Hence, the cost estimate is often more important in low- to moderate load situations. A mechanism for determining the load within the cell (and/or within neighbouring cells) could advantageously be implemented. The cost estimate generation and the comparison between the cost and quality gain could be performed in low load situations, and be switched off for higher loads.

The method of FIG. 3 could be performed every time the set of channels 210 used for transmission within a cell 120 is due to be changed, such as when a new session enters the cell 120, when the quality measurements of a radio link 115 indicates that one or more of the channels 210 used for the radio link 115 does not provide appropriate quality, when a session requires more transmission power than the resource units 205 presently allocated to the radio link 115 can provide. The method could advantageously be used for controlling the admission of new sessions in a system 100. In a system 100 in resource units 205 can be allocated to the radio links 115 on a per-time-frame basis, the method of FIG. 3 could be performed between every time frame 200, or as often as necessary.

The method of FIG. 3 assumes that a new set of channels 210 has been proposed for usage by the radio links 115 within the cell 120 prior to entering step 300, for example by means of identifying channel(s) 210 which would improve the C/I value for one or more mobile stations 105 in the cell 120. However, a method similar to that of FIG. 3 could also be used for identifying the preferred set of channels 210 for one or more mobile stations 105 within a cell 120, by repeatedly calculating the expected quality gain vs. cost for a number of different new sets of channels 210, and selecting a set of channels 210 having a favourable quality gain vs. cost for the channel allocation within the cell 120.

Figure 4:
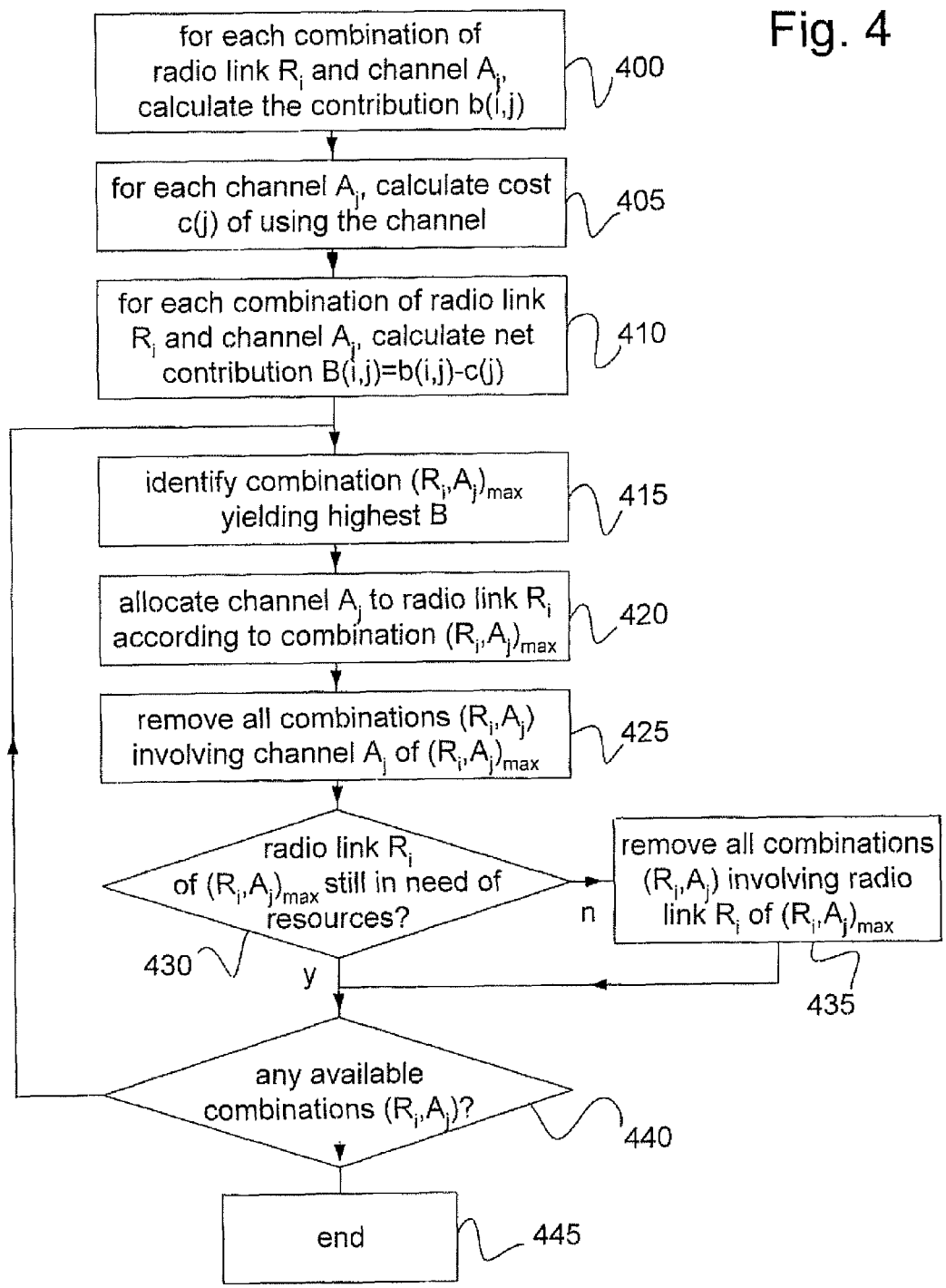
FIG. 4 is a flowchart illustrating a method of selecting a new set of channels to be allocated to radio links within a cell.

An example of a method of identifying a new set of channels 210 to be allocated to a set of radio links 115 by evaluating the available channels 210 on an individual basis is schematically illustrated in FIG. 4, wherein the set of radio links 115 comprises m radio links denoted $R_i$, i=1, . . . ,m, and there are N channels 210 available for allocation, the N channels being denoted $A_j$, j=1, . . . ,N. In the method of FIG. 4, a measure b(ij) of the quality contribution of a channel $A_j$ being used by a radio link $R_i$ is calculated. The quality contribution b could e.g. be expressed as a measured C/I value of the channel $A_j$, or an estimation of the number of bits that can successfully be transmitted over the channel $A_j$. The quality contribution b is a quality measure of a channel 210 which differs from the previously discussed quality gain in that the quality contribution b is not related to the performance in any other time frame 200, whereas the quality gain is related to the improvement in performance over a previous time frame 200.

In step 400 of FIG. 4, the quality contribution b(i,j) is calculated for each combination of radio link $R_i$ and channel $A_j$. In step 405, the cost c(j) of using channel $A_j$ is calculated for each channel $A_j$. The cost c(j) could for example be calculated using one of the following expressions, cf. expressions (3) and (4):

$$c(j) = f \cdot c(A_j \backslash B), \quad (6)$$

or $$c(j) = f \min\left\{\frac{d_j}{d_{thresh}}, 1\right\}, \quad (7)$$

where B denotes the previously used set of channels and $d_j$ is the spectral distance between the channel $A_j$ and the nearest channel 210 in the previously used set of channels B. The threshold distance, $d_{thres}$, is defined as the maximum distance between the channel $A_j$ and the nearest channel 210 used in the previous set of channels for which the cost of using the channel $A_j$ is reduced due to proximity to a channel 210 already in use. The cost c(j) relates to the cost of using a particular channel $A_j$, whereas the total cost, C, expressed by equations (3) and (4) relates to the cost of using the new set of channels 210. The cost c(j) could be defined in other ways, and could for example take into account the usage of any time frames 200 in the near past in addition to the most recent previous time frame 200.

Step 410 is then entered, in which, for all combinations ($R_i,A_j$) the quality contribution, b(i,j), of using a particular channel $A_j$ on a particular radio link $R_i$ are compared to the cost, c(j), of using the channel $A_j$. The difference between the quality contribution, b(i,j) and the cost, c(j), will be referred to as the net quality contribution, B(i,j), of allocating the particular channel $A_j$ to the particular radio link $R_i$. In step 410, the net quality contribution B is calculated for all combinations ($R_i,A_j$). In step 415, the combination ($R_i,A_j$) which yields the highest value of the net quality contribution B is identified. This combination is referred to as the best available combination $(R_i,A_j)_{max}$. In step 420, the channel $A_j$ of $(R_i,A_j)_{max}$ is allocated to the radio link $R_i$ of $(R_i,A_j)_{max}$. In step 420, all combinations ($R_i,A_j$) involving channel $A_j$ of $(R_i,A_j)_{max}$ is removed from the set of available combinations. In step 430, it is checked whether the radio link $R_i$ of $(R_i,A_j)_{max}$ is in need of further resources. If so, step 440 is entered. If not, however, step 435 is entered, in which all combinations involving radio link $R_i$ of $(R_i,A_j)_{max}$ is removed from the set of available combinations ($R_i,A_j$). Step 440 is then entered. In step 440, it is checked whether there are any available combinations ($R_i,A_j$). If not, the process is ended in step 445.

The method of FIG. 4 can be used for a complete re-allocation of all the radio resources within a cell 120 to the active radio links 115 in the cell. The method can also be applied when re-allocating parts of the radio resources.

Figure 5:
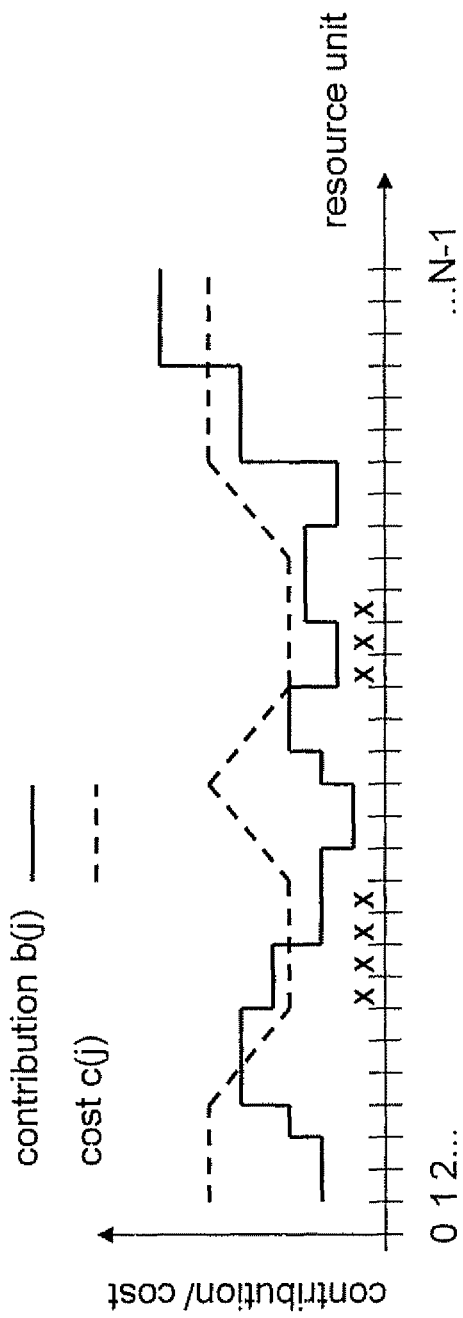
FIG. 5 is a graph schematically illustrating an example of how the cost and the quality contribution of allocating a resource unit to a radio link can vary depending on which resource unit is allocated.

An example of how the cost, c(j), and the quality contribution, b(i,j) can vary as a function of channel 210 for a particular radio link 115 is illustrated in FIG. 5. A time frame 200 comprises N resource units 205 of different frequencies, labelled 0, . . . , N−1. The quality contribution b(j), as well as the cost c(j), are plotted as a function of resource unit 205 (i.e. as a function of channel 210). The quality contribution b(j) of using a resource unit 205 for the particular radio link 115 is based on quality measurements on the channel 210 to which the resource unit 205 belongs. The cost of using the resource unit 205 in the example of FIG. 5 is based on whether or not the channel 210 to which the resource unit 205 belongs has been used in the previous time frame 200, and is calculated according to an expression similar to relation (7), with the addition of there being a cost related to allocating a previously used channel 210 to a different radio link 115 than in the previous time frame 200. On the axis representing resource units 205 in the graph of FIG. 5, an "X" located at a resource unit 205 indicates that the resource unit 205 belongs to a channel 210 which was allocated to a radio link 115 in the previous time frame 200. The threshold distance, $d_{thres}$, in the example of FIG. 5 is set to three times the bandwidth of a resource unit 205. The resource units 205 of FIG. 5 for which the quality contribution b(j) exceeds the cost c(j) could advantageously be allocated to the radio link 115.

The system 100 comprises a comparison apparatus for performing the comparison between the quality achieved by an allocation of resources and the cost involved by the allocation of resources. The comparison apparatus could advantageously be implemented in the radio base stations 110 of system 100. In Fig. 1, the radio base stations 110 are illustrated to comprise a comparison apparatus 125. The comparison apparatus 125 could alternatively be implemented in a base station controller, or similar node, in a relay node located between the mobile station 105 and the radio base station 110, or elsewhere in the system 100. The comparison apparatus 125 could be arranged to receive measurements of channel quality of both the uplink and the downlink parts of radio links 115, and could be arranged to perform quality/cost comparisons for both the uplink and the downlink parts of radio links 115. The comparison apparatus could be advantageously be implemented as a combination of hardware and software. A comparison apparatus could also be implemented in a mobile station 105. This could be particularly useful in a system 100 where the mobile station 105 could select which channels 210 to use for transmission.

The technology described in this application is particularly useful in multi-carrier systems, such as system using orthogonal frequency division access (OFDM) in which the re-allocation of channels 210 is repeated on a time scale similar to the duration of a time frame 200.

In such systems, the fluctuations in interference are fast and unpredictable. However, the technology described in this application can advantageously be applied to any system 100 wherein the allocation of resources in one cell 120 causes interference in a neighbouring cell 120. The technology described in this application can be used for the allocation of resources in both the uplink and the downlink part of a radio link 115.

The method and apparatus create a predictable interference situation in multi-cellular networks operating at low and moderate loads and allow for the resource allocation in a cell 120 to be made independently of the present resource allocation of other cells 120.

The invention claimed is:

1. A method of allocating radio resources to at least one radio link in a cell within a mobile radio communications system, wherein the radio resources are arranged in sets or channels divided into time frames, the method comprising:
generating an estimate of a cost of allocating radio resources available for allocation to the at least one radio link, wherein the cost estimate is generated in dependency of which radio resources have been used within the cell at previous times and of a variation in interference that would be caused by allocating a radio resource that was not allocated to a radio link in the cell during a most recently scheduled time frame; and
allocating radio resources to the at least one radio link in dependency of the cost estimate,
wherein the step of generating an estimate of the cost comprises:
checking whether an available channel was previously allocated to a radio link in the cell during a time frame being the most recently scheduled time frame; and
associating an additional cost to the available channel if it is included in a channel set not previously allocated to a radio link in the most recently scheduled time frame,
wherein the additional cost is not associated to an available channel previously allocated to a radio link in the most recently scheduled time frame.

2. The method of claim 1, further comprising:
generating an estimate of the radio quality of radio resources available for allocation;
comparing the radio quality estimate with the cost estimate resulting in a comparison result; and wherein
the step of allocating comprises allocating radio resources to the radio link in accordance with the comparison result.

3. The method of claim 1, wherein:
the step of generating an estimate of the cost comprises checking the spectral distance between a channel allocated in the cell during the most recently scheduled time frame and a channel available for allocation but not being allocated during the most recently scheduled time frame,
wherein the cost estimate increases with said spectral distance.

4. The method of claim 2, wherein:
the allocation of resources comprises the allocation of resources to at least two radio links over which sessions of different priority are transmitted; and
wherein the step of comparing is performed in a manner so that the priorities of the sessions are taken into account.

5. The method of claim 2, wherein:
the available radio resources comprises at least two different available channels;
the step of generating an estimate of the radio quality comprises generating a radio quality estimate for the at least two different channels;
the step of generating an estimate of the cost comprises generating a cost estimate for the at least two different channels;
the step of comparing yields at least two comparison results; and
the step of allocating comprises selecting the channels to be allocated to the at least one radio link based on the at least two comparison results.

6. The method of claim 1, further comprising:
estimating the number of radio links within the cell, resulting in a load measure; and wherein
the execution of the step of generating an estimate of the cost is conditional on the load measure being below a load threshold.

7. A computer program product for evaluating radio resources in a cell within a mobile radio communications system, the computer program product comprising computer program code operable to, when run on a computer, execute the following:
generating an estimate of a cost of allocating radio resources available for allocation to at least one radio link, wherein the cost estimate is generated in dependency of which radio resources have been used within the cell at previous times and of a variation in interference that would be caused by allocating a radio resource that was not allocated to a radio link in the cell during a most recently scheduled time frame, and wherein the step of generating an estimate of the cost comprises:
checking whether an available channel was previously allocated to a radio link in the cell during a time frame being the most recently scheduled time frame; and
associating an additional cost to the available channel if it is included in a channel set not previously allocated to a radio link in the most recently scheduled time frame,
wherein the additional cost is not associated to an available channel previously allocated to a radio link in the most recently scheduled time frame.

8. A memory arranged to fit in a radio base station, the memory storing the computer program product of claim 7.

9. An apparatus for allocating radio resources to at least one radio link in a cell within a mobile radio communications system, wherein the radio resources are arranged in sets of channels divided into time frames, the apparatus comprising:
cost estimating means arranged to generate an estimate of the cost of allocating radio resources available for allocation to the at least one radio link, the cost estimating means being arranged to generate the cost estimate in dependency of which radio resources have been used within the cell at previous times and of a variation in interference that would be caused by allocating a radio resource that was not allocated to a radio link in the cell during a most recently scheduled time frame,
the cost estimating means further being arranged to check whether an available channel was previously allocated to a radio link in the cell during a time frame being the most recently scheduled time frame, to associate an additional cost to the available channel if the available channel is included in a channel set not previously allocated to a radio link in the most recently time frame, and to not associate the additional cost to an available channel previously allocated to a radio link in the most recently scheduled time frame.

10. The apparatus of claim 9, further comprising:
quality estimating means arranged to estimate a quality measure of radio resources available for allocation and to generate a radio quality estimate;
comparing means arranged to compare the radio quality estimate with the cost estimate and to generate a comparison result; and
allocating means arranged to allocate radio resources to the at least one radio link in accordance with the comparison result.

11. The apparatus of claim 9, wherein
the cost estimating means is arranged to check a spectral distance between a channel allocated in the cell during the most recently scheduled time frame and a channel available for allocation but that was not allocated in the cell during the most recently scheduled time frame and to generate the cost estimate in a manner so that the cost estimate increases with increasing spectral distance.

12. The apparatus of claim 9, comprising selecting means arranged to select at least one channel to be allocated to the at least one radio link based upon a plurality of said comparison results.

13. The apparatus of claim 9, further comprising:
load determining means for determining a load within the cell, the load determining means being arranged to trigger the operation of the cost estimating means when the load is below a load threshold.

14. A radio base station for communicating with mobile stations in a mobile radio communications system comprising the apparatus of claim 9.

15. A mobile radio communications system comprising the apparatus of claim 9.

16. An apparatus for allocating radio resources to at least one radio link in a cell within a mobile radio communications system, wherein the radio resources are arranged in sets of channels divided into time frames, the apparatus comprising:
cost estimating circuitry configured to generate an estimate of the cost of allocating radio resources available for allocation to the at least one radio link, the cost estimating circuitry being configured to generate a lower cost estimate for an old set of radio channel resources recently allocated within the cell and a higher cost estimate for a new set of radio channel resources that have not been recently, previously-allocated in order to minimize interference variations caused by allocating the new set of radio channel resources that have not been recently, previously-allocated,
wherein the cost estimating circuitry is configured to check whether an available channel was previously allocated to a radio link in the cell during a most recently scheduled time frame and to associate an additional cost to the available channel if the available channel is included in a channel set not previously allocated to a radio link in the most recently scheduled time frame.

17. The apparatus of claim 16, where the cost estimating circuitry is further configured to:
estimate a quality measure of radio resources available for allocation and to generate a radio quality estimate;
compare the radio quality estimate with the cost estimate and to generate a comparison result; and
allocate radio resources to the at least one radio link in accordance with the comparison result.

18. The apparatus of claim 16, wherein the cost estimating circuitry is configured to check a spectral distance between a channel in the old set of set of radio channel resources allocated in the cell during the most recently scheduled time frame and a channel available for allocation in the new set of radio channel resources but which was not allocated during the most recently scheduled time frame and to generate the additional cost estimate in a manner so that the additional cost estimate increases with increasing spectral distance.

19. A radio base station for communicating with mobile stations in a mobile radio communications system comprising the apparatus of claim 16.

20. A mobile radio station for communicating with at least one radio base station in a mobile radio communications system comprising the apparatus of claim 16.

\* \* \* \* \*

UNITED STATES PATENT AND TRADEMARK OFFICE
CERTIFICATE OF CORRECTION

PATENT NO. : 8,699,422 B2  
APPLICATION NO. : 12/088209  
DATED : April 15, 2014  
INVENTOR(S) : Skillermark et al.

Page 1 of 1

It is certified that error appears in the above-identified patent and that said Letters Patent is hereby corrected as shown below:

In the Specification

In Column 8, Line 34, after equation, delete "(6)" and insert -- (5) --, therefor.

In Column 9, Line 21, delete "b(ij)" and insert -- b(i,j) --, therefor.

In Column 9, Line 22, delete "$R_i$;" and insert -- $R_i$, --, therefor.

In the Claims

In Column 11, Line 21, in Claim 1, delete "sets or" and insert -- sets of --, therefor.

In Column 14, Line 17, in Claim 17, delete "where" and insert -- wherein --, therefor.

In Column 14, Line 27, in Claim 18, delete "set of set of" and insert -- set of --, therefor.

Signed and Sealed this  
Ninth Day of December, 2014

Michelle K. Lee  
*Deputy Director of the United States Patent and Trademark Office*